US011492496B2

(12) United States Patent
Hoermann et al.

(10) Patent No.: US 11,492,496 B2
(45) Date of Patent: Nov. 8, 2022

(54) TORCH STINGER METHOD AND APPARATUS

(71) Applicant: MONOLITH MATERIALS, INC., Redwood City, CA (US)

(72) Inventors: Alexander F. Hoermann, Menlo Park, CA (US); Roscoe W. Taylor, Kingwood, TX (US); Christopher J.-P. Cardinal, Sunnyvale, CA (US); Peter L. Johnson, Mountain View, CA (US); Ned J. Hardman, Lincoln, NE (US); Robert J. Hanson, San Carlos, CA (US)

(73) Assignee: MONOLITH MATERIALS, INC., Lincoln, NE (US)

( * ) Notice: Subject to any disclaimer, the term of this patent is extended or adjusted under 35 U.S.C. 154(b) by 61 days.

(21) Appl. No.: 16/097,035

(22) PCT Filed: Apr. 28, 2017

(86) PCT No.: PCT/US2017/030139
§ 371 (c)(1),
(2) Date: Oct. 26, 2018

(87) PCT Pub. No.: WO2017/190015
PCT Pub. Date: Nov. 2, 2017

(65) Prior Publication Data
US 2019/0153234 A1    May 23, 2019

Related U.S. Application Data

(60) Provisional application No. 62/329,516, filed on Apr. 29, 2016.

(51) Int. Cl.
| C09C 1/48 | (2006.01) |
| H05H 1/34 | (2006.01) |
| H05H 1/42 | (2006.01) |
| C09C 1/50 | (2006.01) |
| B01J 19/08 | (2006.01) |

(52) U.S. Cl.
CPC ............. *C09C 1/485* (2013.01); *B01J 19/088* (2013.01); *C09C 1/48* (2013.01); *C09C 1/50* (2013.01); *H05H 1/34* (2013.01); *H05H 1/42* (2013.01); *B01J 2219/0832* (2013.01); *B01J 2219/0869* (2013.01); *B01J 2219/0871* (2013.01); *B01J 2219/0875* (2013.01); *B01J 2219/0898* (2013.01); *H05H 1/3431* (2021.05); *H05H 1/3478* (2021.05)

(58) Field of Classification Search
CPC .................................................... C09C 1/485
See application file for complete search history.

(56) References Cited

U.S. PATENT DOCUMENTS

| 1,339,225 A | 5/1920 | Rose |
| 1,536,612 A | 5/1925 | Lewis |
| 1,597,277 A | 8/1926 | Jakowsky |
| 2,062,358 A | 9/1932 | Frolich |
| 2,002,003 A | 5/1935 | Eisenhut et al. |
| 2,039,312 A | 5/1936 | Goldman |
| 2,393,106 A | 1/1946 | Johnson et al. |
| 2,557,143 A | 6/1951 | Royster |
| 2,572,851 A | 10/1951 | Gardner et al. |
| 2,603,669 A | 7/1952 | Chappell |
| 2,616,842 A | 11/1952 | Sheer et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,951,143 A | 8/1960 | Anderson et al. |
| 3,009,783 A | 11/1961 | Sheer et al. |
| 3,073,769 A | 1/1963 | Doukas |
| 3,127,536 A | 3/1964 | McLane |
| 3,253,890 A | 5/1966 | De et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. |
| 3,408,164 A | 10/1968 | Johnson |
| 3,409,403 A | 11/1968 | Bjornson et al. |
| 3,420,632 A | 1/1969 | Ryan |

(Continued)

FOREIGN PATENT DOCUMENTS

| AU | 28970/71 A | 11/1972 |
| CA | 830378 A | 12/1969 |

(Continued)

OTHER PUBLICATIONS

AP 42, Fifth Edition, vol. I, Chapter 6: Organic Chemical Process Industry, Section 6.1: Carbon Black.
Ayala et al., "Carbon Black Elastomer Interaction" Rubber Chemistry and Technology, 1991, pp. 19-39.
Bakken et al. "Thermal plasma process development in Norway." Pure and applied Chemistry 70.6 (1998): 1223-1228.
Boehm, "Some Aspects of Surface Chemistry of Carbon Blacks and Other Carbons", Carbon 1994, p. 759.
Breeze, "Raising steam plant efficiency—Pushing the steam cycle boundaries." PEI Magazine 20.4 (2012).

(Continued)

*Primary Examiner* — Stuart L Hendrickson
(74) *Attorney, Agent, or Firm* — Wilson Sonsini Goodrich & Rosati

(57) ABSTRACT

A torch stinger apparatus may comprise one or more sets of plasma generating electrodes and at least one hydrocarbon injector contained within the electrodes. The electrodes may be concentric. The at least one hydrocarbon injector may be cooled. A method of making carbon particles using the apparatus is also described.

16 Claims, 1 Drawing Sheet

(56) References Cited

U.S. PATENT DOCUMENTS

| | | |
|---|---|---|
| 3,431,074 A | 3/1969 | Jordan |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho |
| 3,725,103 A | 4/1973 | Jordan et al. |
| 3,922,335 A | 11/1975 | Jordan et al. |
| 3,981,654 A | 9/1976 | Rood et al. |
| 3,981,659 A | 9/1976 | Myers |
| 3,984,743 A | 10/1976 | Horie |
| 3,998,934 A | 12/1976 | Vanderveen |
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,088,741 A | 5/1978 | Takewell |
| 4,101,639 A | 7/1978 | Surovikin et al. |
| 4,138,471 A | 2/1979 | Lamond et al. |
| 4,199,545 A | 4/1980 | Matovich |
| 4,282,199 A | 8/1981 | Lamond et al. |
| 4,289,949 A | 9/1981 | Raaness et al. |
| 4,292,291 A | 9/1981 | Rothbuhr |
| 4,317,001 A | 2/1982 | Silver et al. |
| 4,372,937 A | 2/1983 | Johnson |
| 4,404,178 A | 9/1983 | Johnson et al. |
| 4,452,771 A | 6/1984 | Hunt |
| 4,431,624 A | 8/1984 | Casperson |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,147,998 A | 9/1992 | Tsantrizos et al. |
| 5,206,880 A | 4/1993 | Olsson |
| 5,222,448 A | 6/1993 | Morgenthaler et al. |
| 5,352,289 A | 10/1994 | Weaver et al. |
| 5,399,957 A | 3/1995 | Vierboom et al. |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,593,644 A | 1/1997 | Norman et al. |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,058,133 A | 5/2000 | Bowman et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,582,184 B2 * | 9/2009 | Tomita ............... H01J 37/32009 |
| | | 118/723 E |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,847,009 B2 | 12/2010 | Wong et al. |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 9,095,835 B2 | 8/2015 | Skoptsov et al. |
| 9,229,396 B1 | 1/2016 | Wu et al. |
| 9,315,735 B2 | 4/2016 | Cole et al. |
| 9,445,488 B2 | 9/2016 | Foret |
| 9,574,086 B2 | 2/2017 | Johnson et al. |
| 9,679,750 B2 * | 6/2017 | Choi ................ H01J 37/32541 |
| 10,100,200 B2 | 10/2018 | Johnson et al. |
| 10,138,378 B2 | 11/2018 | Hoermman et al. |
| 10,370,539 B2 | 8/2019 | Johnson et al. |
| 10,808,097 B2 | 10/2020 | Hardman et al. |
| 11,149,148 B2 | 10/2021 | Taylor et al. |
| 11,203,692 B2 | 12/2021 | Hoermann et al. |
| 2001/0029888 A1 | 10/2001 | Sindarrajan et al. |
| 2001/0039797 A1 | 11/2001 | Cheng |
| 2002/0000085 A1 | 1/2002 | Hall et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0152184 A1 | 8/2003 | Shehane et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |

(56) References Cited

U.S. PATENT DOCUMENTS

| | | |
|---|---|---|
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0120137 A1 | 5/2011 | Ennis |
| 2011/0138766 A1 | 6/2011 | Elkady et al. |
| 2011/0155703 A1 | 6/2011 | Winn |
| 2011/0180513 A1 | 7/2011 | Luhrs et al. |
| 2011/0214425 A1 | 9/2011 | Lang et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2016/0030856 A1 | 2/2016 | Kaplan et al. |
| 2016/0243518 A1 | 8/2016 | Spitzl |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0340074 A1 | 11/2018 | Wittmann et al. |
| 2018/0366734 A1 | 12/2018 | Korchev et al. |
| 2019/0048200 A1 | 2/2019 | Johnson et al. |
| 2020/0140691 A1 | 5/2020 | Johnson et al. |
| 2020/0239696 A1 | 7/2020 | Johnson et al. |
| 2020/0239697 A1 | 7/2020 | Wittmann et al. |
| 2020/0291237 A1 | 9/2020 | Hardman et al. |
| 2021/0017025 A1 | 1/2021 | Hardman |
| 2021/0017031 A1 | 1/2021 | Hardman et al. |
| 2021/0020947 A1 | 1/2021 | Hardman et al. |
| 2021/0071007 A1 | 3/2021 | Hardman et al. |
| 2021/0120658 A1 | 4/2021 | Moss et al. |
| 2021/0261417 A1 | 8/2021 | Cardinal et al. |

FOREIGN PATENT DOCUMENTS

| | | |
|---|---|---|
| CA | 964405 A1 | 3/1975 |
| CA | 2 353 752 A1 | 1/2003 |
| CA | 2 621 749 A1 | 8/2009 |
| CN | 86104761 A | 2/1987 |
| CN | 1059541 A | 3/1992 |
| CN | 1076206 A | 9/1993 |
| CN | 1077329 A | 10/1993 |
| CN | 1078727 A | 11/1993 |
| CN | 1086527 A | 5/1994 |
| CN | 1196032 A | 10/1998 |
| CN | 1398780 A | 2/2003 |
| CN | 1458966 A | 11/2003 |
| CN | 1644650 A | 7/2005 |
| CN | 101092691 A | 12/2007 |
| CN | 101193817 A | 6/2008 |
| CN | 101198442 A | 6/2008 |
| CN | 201087175 Y | 7/2008 |
| CN | 101368010 A | 2/2009 |
| CN | 101657283 A | 2/2010 |
| CN | 101734620 A | 6/2010 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 105070518 A | 11/2015 |
| CN | 105073906 A | 11/2015 |
| CN | 205472672 U | 8/2016 |
| DE | 211457 A3 | 7/1984 |
| DE | 198 07 224 A1 | 8/1999 |
| EA | 200300389 A1 | 12/2003 |
| EP | 0315442 A2 | 5/1989 |
| EP | 0 325 689 A1 | 8/1989 |

(56) References Cited

FOREIGN PATENT DOCUMENTS

| | | |
|---|---|---|
| EP | 0616600 A1 | 9/1994 |
| EP | 0 635 043 B1 | 6/1996 |
| EP | 0 635 044 B1 | 6/1996 |
| EP | 0 861 300 A1 | 9/1998 |
| EP | 0982378 A1 | 3/2000 |
| EP | 1017622 A1 | 7/2000 |
| EP | 1 188 801 A1 | 3/2002 |
| EP | 1 088 854 A2 | 4/2010 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| FR | 1249094 A | 12/1960 |
| FR | 2 891 434 A1 | 3/2007 |
| FR | 2 937 029 A1 | 4/2010 |
| GB | 395 893 A | 7/1933 |
| GB | 987498 | 3/1965 |
| GB | 1068519 A | 5/1967 |
| GB | 1 400 266 A | 7/1975 |
| GB | 1 492 346 A | 11/1977 |
| GB | 2419883 A | 5/2006 |
| JP | S5021983 B1 | 7/1975 |
| JP | S5987800 A | 5/1984 |
| JP | H0011074 | 1/1989 |
| JP | 4-228270 A | 8/1992 |
| JP | H05226096 A | 9/1993 |
| JP | H06302527 A | 10/1994 |
| JP | 6-322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | 9-316645 A | 12/1997 |
| JP | 11-123562 A | 5/1999 |
| JP | 2001253974 A | 9/2001 |
| JP | 2002121422 A | 4/2002 |
| JP | 2004-300334 A | 10/2004 |
| JP | 2005-235709 A | 9/2005 |
| JP | 2005-243410 A | 9/2005 |
| KR | 10-2008-105344 A | 12/2008 |
| KR | 2014-0075261 A | 6/2014 |
| RU | 2425795 C2 | 8/2011 |
| RU | 2488984 C2 | 7/2013 |
| TW | 200418933 A | 10/2004 |
| WO | WO-9204415 A1 | 3/1992 |
| WO | 93/12031 A1 | 6/1993 |
| WO | WO-9312030 A1 | 6/1993 |
| WO | WO-9312633 A1 | 6/1993 |
| WO | 93/18094 A1 | 9/1993 |
| WO | 93/20153 A1 | 10/1993 |
| WO | WO-9320152 A1 | 10/1993 |
| WO | 93/23331 | 11/1993 |
| WO | 94/08747 | 4/1994 |
| WO | WO-9618688 A1 | 6/1996 |
| WO | 97/03133 A1 | 1/1997 |
| WO | 98/13428 A1 | 4/1998 |
| WO | WO-0018682 A1 | 4/2000 |
| WO | WO-0224819 A1 | 3/2002 |
| WO | 03/014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | WO-2014149455 A1 | 9/2014 |
| WO | 2015/049008 A1 | 4/2015 |
| WO | WO-2015051893 A1 | 4/2015 |
| WO | 2015/093947 A1 | 6/2015 |
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/014641 A1 | 8/2016 |
| WO | 2016/126598 A1 | 8/2016 |
| WO | 2016/126599 A1 | 8/2016 |
| WO | 2016/126600 A1 | 8/2016 |
| WO | 2017/019683 A1 | 2/2017 |
| WO | 2017/027385 A1 | 2/2017 |
| WO | 2017/034980 A1 | 3/2017 |
| WO | 2017/044594 A1 | 3/2017 |
| WO | 2017/048621 A1 | 3/2017 |
| WO | 2017/190015 A1 | 11/2017 |
| WO | 2017/190045 A1 | 11/2017 |
| WO | 2018/165483 A1 | 9/2018 |
| WO | 2018/195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |

OTHER PUBLICATIONS

Cataldo, "The impact of a fullerene-like concept in carbon black science," Carbon (2002) 40:157-162.

Chiesa et al., "Using Hydrogen as Gas Turbine Fuel". ASME. J. Eng. Gas Turbines Power (2005),127(1):73-80. doi: 10.1115/1.1787513.

Cho et al. "Conversion of natural gas to hydrogen and carbon black by plasma and application of plasma black", Symposia—American Chemical Society, Div. Fuel Chem. (2004), 49:181-183.

Donnet et al. "Observation of Plasma-Treated Carbon Black Surfaces by Scanning Tunnelling Microscopy," Carbon (1994) 32(2):199-206.

Donnet, Basal and Wang, "Carbon Black", New York: Marcel Dekker, 1993 pp. 46, 47 and 54.

Fabry et al., "Carbon black processing by thermal plasma. Analysis of the particle formation mechanism." Chemical Engineering Science (2001) 56:2123-2132.

Fulcheri et al., "From methane to hydrogen, carbon black and water," Int. J. Hydrogen Energy (1995) 20(3):197-202.

Fulcheri et al., "Plasma processing: a step towards the production of new grades of carbon black." Carbon (2002) 40:169-176.

Garberg, et al. "A transmission electron microscope and electron diffraction study of carbon nanodisks." Carbon 46.12 (2008): 1535-1543.

Grivei, et al. "A clean process for carbon nanoparticles and hydrogen production from plasma hydrocarbon cracking." Publishable Report, European Commission Joule III Programme, Project No. JOE3-CT97-0057, circa 2000.

Høyer, et al. "Microelectromechanical strain and pressure sensors based on electric field aligned carbon cone and carbon black particles in a silicone elastomer matrix." Journal of Applied Physics 112.9 (2012): 094324.

(56) References Cited

OTHER PUBLICATIONS

Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Larouche et al. "Nitrogen Functionalization of Carbon Black in a Thermo-Convective Plasma Reactor," Plasma Chem Plasma Process (2011) 31:635-647.
Naess et al. "Carbon nanocones: wall structure and morphology." Science and Technology of advanced materials (2009), 7 pages.
Polman et al., "Reduction of CO2 emissions by adding hydrogen to natural gas." IEA Green House Gas R&D programme (2003).
Pristavita, et al. "Carbon blacks produced by thermal plasma: the influence of the reactor geometry on the product morphology." Plasma Chemistry and Plasma Processing 30.2 (2010): 267-279.
Pristavita, et al. "Carbon nanoparticle production by inductively coupled thermal plasmas: controlling the thermal history of particle nucleation." Plasma Chemistry and Plasma Processing 31.6 (2011): 851-866.
Pristavita, et al. "Volatile Compounds Present in Carbon Blacks Produced by Thermal Plasmas." Plasma Chemistry and Plasma Processing 31.6 (2011): 839-850.
Reese, J. (2017). Resurgence in American manufacturing will be led by the rubber and tire industry. Rubber World. 255. 18-21 and 23.
Reynolds, "Electrode Resistance: How Important is Surface Area" Oct. 10, 2016. Page 3 para[0001]; Figure 3; Retrieved from http://electrofishing.net/2016/10/10/electrode-resistance-how-important-is-surface-area/ on May 8, 2018.
Sun et al., "Preparation of carbon black via arc discharge plasma enhanced by thermal pyrolysis", Diamond & Related Materials (2015), doi: 10.1016/j.diamond.2015.11.004, 47 pages.
Tsujikawa, Y., and T. Sawada. "Analysis of a gas turbine and steam turbine combined cycle with liquefied hydrogen as fuel." International Journal of Hydrogen Energy 7.6 (1982): 499-505.
U.S. Environmental Protection Agency, "Guide to Industrial Assessments for Pollution Prevention and Energy Efficiency," EPA 625/R-99/003, 1999.
Verfondern, K., "Nuclear Energy for Hydrogen Production", Schriften des Forschungzentrum Julich, vol. 58, 2007.
Wikipedia "Heating Element" Oct. 14, 2016. p. 1 para[0001]. Retrieved from https://en.wikipedia.org/w/index.php?title=Heating_element&oldid=744277540 on May 9, 2018.
Wikipedia "Joule Heating" Jan. 15, 2017. p. 1 para[0002]. Retrieved from https://en.wikipedia.org/w/index.php?title=Joule_heating&oldid=760136650 on May 9, 2018.
Corrected Notice of Allowance dated Feb. 9, 2018 in U.S. Appl. No. 14/601,761.
Ex Parte Quayle Action dated May 19, 2017 in U.S. Appl. No. 14/601,761.
Extended European Search Report from EP Application No. 15742910.1 dated Jul. 18, 2017.
Extended European Search Report from EP Application No. 15743214.7 dated Jan. 16, 2018.
Extended European Search Report from EP Application No. 16747055.8 dated Jun. 27, 2018.
Extended European Search Report from EP Application No. 16747056.6 dated Jun. 27, 2018.
Extended European Search Report from EP Application No. 16747057.4 dated Oct. 9, 2018.
Extended European Search Report from EP Application No. 16835697.0 dated Nov. 28, 2018.
Final Office Action dated Aug. 3, 2016 in U.S. Appl. No. 14/601,793.
Final Office Action dated Jul. 11, 2016 in U.S. Appl. No. 14/591,476.
Final Office Action dated Jul. 14, 2016 in U.S. Appl. No. 14/591,541.
Final Office Action dated Oct. 13, 2017 in U.S. Appl. No. 14/591,476.
Final Office Action dated Oct. 13, 2017 in U.S. Appl. No. 14/591,541.
Final Office Action dated Oct. 19, 2016 in U.S. Appl. No. 14/601,761.
Final Office Action dated Sep. 19, 2017 in U.S. Appl. No. 15/221,088.
Final Office Action from U.S. Appl. No. 15/259,884, dated Oct. 11, 2018.
Invitation to Pay Additional Fees dated Jun. 18, 2018 in PCT/US2018/028619.
IPRP from PCT/US2015/013482, dated Aug. 2, 2016.
IPRP from PCT/US2015/013484, dated Aug. 2, 2016.
IPRP from PCT/US2015/013487, dated Aug. 2, 2016.
IPRP from PCT/US2015/013505, dated Aug. 2, 2016.
IPRP from PCT/US2015/013510, dated Aug. 2, 2016.
IPRP from PCT/US2017/030139 dated Oct. 30, 2018.
IPRP from PCT/US2017/030179 dated Oct. 30, 2018.
ISR and Written Opinion for PCT/US2018/048374 dated Nov. 26, 2018.
ISR and Written Opinion for PCT/US2018/048378 dated Dec. 20, 2018.
ISR and Written Opinion for PCT/US2018/048381 dated Dec. 14, 2018.
ISR and Written Opinion from PCT/US2015/013794, dated Jun. 19, 2015.
ISR and Written Opinion from PCT/US2016/015939, dated Jun. 3, 2016.
ISR and Written Opinion from PCT/US2016/015941, dated Apr. 21, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/047769, dated Dec. 30, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2017/030139, dated Jul. 19, 2017.
ISR and Written Opinion from PCT/US2017/030179, dated Jul. 27, 2017.
ISR and Written Opinion from PCT/US2018/021627, dated May 31, 2018.
ISR and Written Opinion from PCT/US2018/028619, dated Aug. 9, 2018.
Non-Final Office Action dated Apr. 13, 2016 in U.S. Appl. No. 14/601,793.
Non-Final Office Action dated Apr. 14, 2016 in U.S. Appl. No. 14/601,761.
Non-Final Office Action dated Apr. 20, 2018 in U.S. Appl. No. 15/221,088.
Non-Final Office Action dated Dec. 23, 2016 in U.S. Appl. No. 15/221,088.
Non-Final Office Action dated Feb. 22, 2017 in U.S. Appl. No. 14/591,541.
Non-Final Office Action dated Feb. 27, 2017 in U.S. Appl. No. 14/591,476.
Non-Final Office Action dated Jan. 16, 2018 in U.S. Appl. No. 14/591,528.
Non-Final Office Action dated Jan. 9, 2018 in U.S. Appl. No. 15/259,884.
Non-Final Office Action dated Jul. 6, 2018 in U.S. Appl. No. 15/241,771.
Non-Final Office Action dated Jun. 1, 2018 in U.S. Appl. No. 15/262,539.
Non-Final Office Action dated Jun. 7, 2018 in U.S. Appl. No. 14/591,476.
Non-Final Office Action dated Jun. 7, 2018 in U.S. Appl. No. 15/410,283.
Non-Final Office Action dated Mar. 16, 2016 in U.S. Appl. No. 14/591,476.
Non-Final Office Action dated Mar. 16, 2016 in U.S. Appl. No. 14/591,541.
Non-Final Office Action dated May 2, 2017 in U.S. Appl. No. 14/610,299.

(56) References Cited

OTHER PUBLICATIONS

Non-Final Office Action from U.S. Appl. No. 15/548,352 dated Oct. 10, 2018.
Notice of Allowance dated Jan. 18, 2018 in U.S. Appl. No. 14/601,761.
Notice of Allowance dated Jun. 19, 2018 in U.S. Appl. No. 14/601,761.
Notice of Allowance dated Jun. 7, 2018 in U.S. Appl. No. 14/591,541.
Notice of Allowance dated Oct. 7, 2016 in U.S. Appl. No. 14/601,793.
Search Report from RU Application No. 2016135213 dated Feb. 12, 2018.
Supplementary Partial European Search Report from EP Application No. 15743214.7 dated Sep. 12, 2017.
Translation of Official Notification of RU Application No. 2016135213 dated Feb. 12, 2018.
Final Office Action for U.S. Appl. No. 15/262,539 dated Jan. 4, 2019.
Gago et al., "Growth mechanisms and structure of fullerene-like carbon-based thin films: superelastic materials for tribological applications," Trends in Fullerene Research, Published by Nova Science Publishers, Inc. (2007), pp. 1-46.
Biscoe, et al., An X-ray study of carbon black. Journal of Applied physics, 1942; 13: 364-371.
Carmer, et al., Formation of silicon carbide particles behind shock waves. Appl. Phys. Lett. 54 (15), Apr. 10, 1989. 1430-1432.
Co-pending U.S. Appl. No. 16/807,550, inventors Taylor; Roscoe W. et al., filed Mar. 3, 2020.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/072,416, inventors Taylor; Roscoe W. et al., filed Oct. 16, 2020.
Co-pending U.S. Appl. No. 17/239,041, inventors Hardmanned; J. et al., filed Apr. 23, 2021.
Co-pending U.S. Appl. No. 17/245,296, inventors Johnsonpeter; L. et al., filed Apr. 30, 2021.
Co-pending U.S. Appl. No. 17/329,532, inventors Taylorroscoe; W. et al., filed May 25, 2021.
Co-pending U.S. Appl. No. 17/412,913, inventors Johnson; Peter L. et al., filed Aug. 26, 2021.
Co-pending U.S. Appl. No. 17/473,106, inventors Taylorroscoe; W. et al., filed Sep. 13, 2021.
Co-pending U.S. Appl. No. 17/487,982, inventors Hoermannalexander; F. et al., filed Sep. 28, 2021.
Co-pending U.S. Appl. No. 17/529,928, inventors Hardmanned; J. et al., filed Nov. 18, 2021.
Co-pending U.S. Appl. No. 17/565,864, inventors Taylorroscoe; W. et al., filed Dec. 30, 2021.
Co-pending U.S. Application No. 202117498693, inventors Johnsonpeter; L. et al., filed Oct. 11, 2021.
Database WPI, Week 200323, 2017 Clarivate Analytics. Thomson Scientific, London, GB; Database accession No. 2003-239603, XP002781693.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Novembers, 2019.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Frenklach, et al., Silicon carbide and the origin of interstellar carbon grains. Nature, vol. 339; May 18, 1989: 196-198.
Gomez-Pozuelo, et al., Hydrogen production by catalytic methane decomposition over rice husk derived silica. Fuel, Dec. 15, 2021; 306: 121697.
Hernandez, et al. Comparison of carbon nanotubes and nanodisks as percolative fillers in electrically conductive composites. Scripta Materialia 58 (2008) 69-72.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report for Application No. PCT/US2015/13482 dated Jun. 17, 2015.
International Search Report for Application No. PCT/US2015/13487 dated Jun. 16, 2015.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
Medalia, et al., Tinting Strength of Carbon Black. Journal of Colloid and Interface Science 40.2. (1972).
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
PCT/US2021/053371 International Search Report and Written Opinion dated Feb. 17, 2022.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 16/657,386 Notice of Allowance dated May 20, 2022.
U.S. Appl. No. 14/591,541 Notice of Allowance dated Sep. 17, 2018.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.
U.S. Appl. No. 14/601,761 Notice of Allowance dated Feb. 9, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/610,299 Notice of Allowance dated Dec. 13, 2021.
U.S. Appl. No. 14/610,299 Notice of Allowance dated Feb. 20, 2020.

(56) References Cited

OTHER PUBLICATIONS

U.S. Appl. No. 14/610,299 Notice of Allowance dated Nov. 16, 2021.
U.S. Appl. No. 14/610,299 Office Action dated Feb. 17, 2021.
U.S. Appl. No. 14/610,299 Office Action dated Sep. 25, 2018.
U.S. Appl. No. 15/221,088 Office Action dated Dec. 4, 2019.
U.S. Appl. No. 15/221,088 Office Action dated Mar. 7, 2019.
U.S. Appl. No. 15/229,608 Office Action dated Apr. 4, 2022.
U.S. Appl. No. 15/229,608 Office Action dated Apr. 8, 2019.
U.S. Appl. No. 15/229,608 Office Action dated Feb. 1, 2021.
U.S. Appl. No. 15/229,608 Office Action dated May 15, 2020.
U.S. Appl. No. 15/229,608 Office Action dated Oct. 25, 2019.
U.S. Appl. No. 15/241,771 Office Action dated Dec. 30, 2021.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jun. 18, 2021.
U.S. Appl. No. 15/259,884 Office Action dated Mar. 4, 2022.
U.S. Appl. No. 15/259,884 Office Action dated May 31, 2019.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jul. 31, 2020.
U.S. Appl. No. 15/410,283 Office Action dated Mar. 12, 2019.
U.S. Appl. No. 15/548,346 Office Action dated Jul. 16, 2021.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 22, 2019.
U.S. Appl. No. 15/548,348 Notice of Allowance dated Dec. 12, 2019.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Sep. 21, 2021.
U.S. Appl. No. 16/097,039 Notice of Allowance dated Jun. 14, 2021.
U.S. Appl. No. 16/097,039 Office Action dated Nov. 18, 2020.
U.S. Appl. No. 16/159,144 Office Action dated Mar. 26, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Office Action dated Apr. 15, 2022.
U.S. Appl. No. 16/445,727 Office Action dated Aug. 17, 2021.
U.S. Appl. No. 16/657,386 Office Action dated Nov. 12, 2021.
U.S. Appl. No. 16/802,174 Office Action dated Feb. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/802,190 Office Action dated Jan. 31, 2022.
What is Carbon Black, Orion Engineered Carbons, (Year: 2015).

* cited by examiner

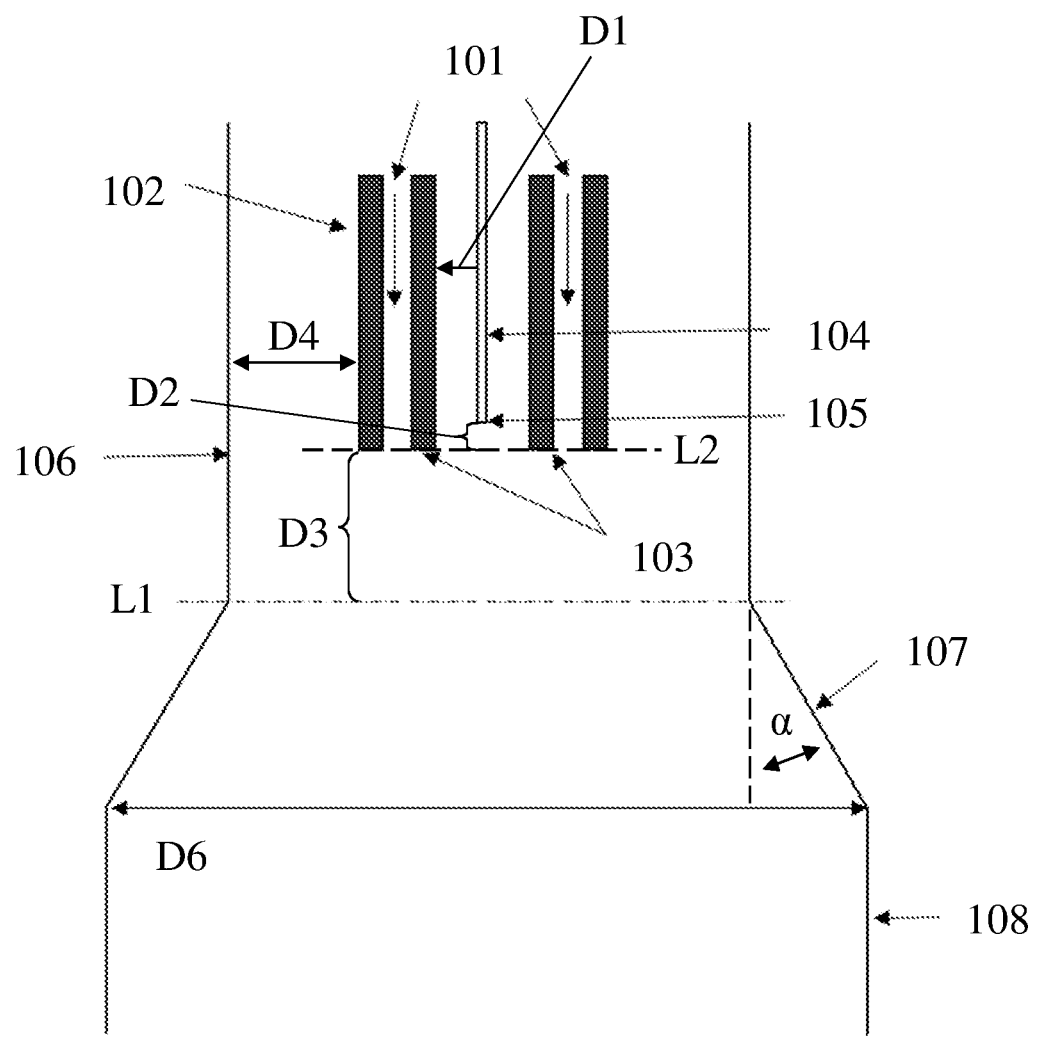

TORCH STINGER METHOD AND APPARATUS

CROSS-REFERENCE

This application claims the benefit of U.S. Provisional Application No. 62/329,516, filed Apr. 29, 2016, which is entirely incorporated herein by reference.

BACKGROUND

Particles are used in many household and industrial applications. The particles may be produced by various chemical processes. Performance and energy supply associated with such chemical processes has evolved over time.

SUMMARY

The present disclosure recognizes a need for more efficient and effective processes to produce particles, such as, for example, carbon particles. Also recognized herein is a need to increase speed of production, increase yields, reduce manufacturing equipment wear characteristics, etc. The present disclosure may provide, for example, improved processes for converting hydrocarbon-containing materials into carbon particles.

The present disclosure provides, for example, a carbon black particle generating reactor, comprising: a plasma generating section containing one or more sets of concentric electrodes configured to generate a plasma; a reactor section connected to the plasma generating section; and an injector located within the concentric electrodes, wherein temperature centrally within the concentric electrodes is less than a temperature of the plasma generated by the concentric electrodes. The injector may be located centrally within the concentric electrodes. The reactor may further comprise a plurality of injectors contained within the concentric electrodes. The injector may be cooled. The temperature centrally within the concentric electrodes may be less than half of the temperature of the plasma generated by the concentric electrodes.

The present disclosure also provides, for example, a process for making carbon black particles, comprising: generating a plasma arc in a high temperature zone of a reactor with concentric plasma generating electrodes; and injecting a hydrocarbon into the reactor to form the carbon black particles, wherein the hydrocarbon is injected into the reactor through at least one hydrocarbon injector located within the concentric plasma generating electrodes, and wherein heat loss during the process due to the at least one hydrocarbon injector is less than about 20% of total energy input into the process. The at least one hydrocarbon injector may be located centrally within the concentric plasma generating electrodes. Temperature centrally within the concentric plasma generating electrodes may be less than half of a temperature of the plasma arc. The hydrocarbon may be natural gas. The injected hydrocarbon may form the carbon black particles and hydrogen after passing through the high temperature zone. The carbon black particles and hydrogen may be produced at greater than 95% yield. N2SA of the carbon black particles may be between about 15 $m^2/g$ and 150 $m^2/g$. STSA of the carbon black particles may be between about 15 $m^2/g$ and 150 $m^2/g$. DBP of the carbon black particles may be greater than about 32 ml/100 g. The carbon black particles, as produced, may have $L_c$ greater than about 3.5 nm and d002 less than about 0.36 nm. The heat loss during the process due to the at least one hydrocarbon injector may be less than about 5% of total energy input into the process. The heat loss during the process due to the at least one hydrocarbon injector may be less than or equal to about 2% of total energy input into the process. Hydrocarbon flow from the cooled injector may be allowed to proceed to an uncooled tube which may act as an injector but may be allowed to heat to a temperature greater than about 1600° C. The tube may comprise or be made from carbon or silicon carbide or other high temperature material capable of surviving at temperatures greater than about 1600° C. The reactor may be an enclosed particle generating reactor.

The present disclosure also provides, for example, a method for making carbon black particles, comprising: flowing a thermal transfer gas between electrodes in a reactor; generating a plasma arc with the electrodes; and injecting a hydrocarbon into the reactor to form the carbon black particles, wherein the hydrocarbon is injected into the reactor through at least one hydrocarbon injector located within the electrodes, and wherein the carbon black particles have a transmittance of toluene extract greater than or equal to about 94%. The carbon black particles may have a transmittance of toluene extract greater than or equal to about 99%. The method may further comprise flowing at least about 25% of the thermal transfer gas between the electrodes. The electrodes may comprise an inner electrode and an outer electrodes, and the method may further comprise flowing the thermal transfer gas outside of the outer electrode. The method may further comprise flowing at least about 20% of the thermal transfer gas outside of the outer electrode. The electrodes may comprise an inner electrode and an outer electrodes, and the method may further comprise flowing the thermal transfer gas inside of the inner electrode. The method may further comprise flowing at least about 10% of the thermal transfer gas around the at least one hydrocarbon injector. The method may further comprise flowing at least about 30% of the thermal transfer gas around the at least one hydrocarbon injector. The method may further comprise flowing at least about 40% of the thermal transfer gas around the at least one hydrocarbon injector. The method may further comprise varying insertion length of the at least one hydrocarbon injector within the electrodes. The method may further comprise varying the insertion length of the at least one hydrocarbon injector using a sliding seal. The method may further comprise varying a degree of pre-dilution of the hydrocarbon to control surface area and/or structure of the carbon black particles. The method may further comprise varying the degree of pre-dilution of the hydrocarbon by (i) varying the insertion length of the at least one hydrocarbon injector within the electrodes, (ii) varying a flow rate of the thermal transfer gas around the at least one hydrocarbon injector, or (iii) a combination thereof. The at least one hydrocarbon injector may be cooled by a cooling circuit, and the method may further comprise retracting the at least one hydrocarbon injector upon detection of a given increase in temperature difference between an inlet temperature and an outlet temperature of the cooling circuit. The method may further comprise retracting the at least one hydrocarbon injector based on a strain gauge that weighs how much electrode material remains. The method may further comprise varying a diameter of the reactor downstream of the electrodes to affect product quality and/or deposit formation. The reactor may comprise a liner that separates an inner reaction zone from an outer insulated area that contains a different gas than the inner reaction zone in order to reduce thermal conductivity of insulation in the outer insulated area. The inner reaction zone may comprise a gas comprising greater than or equal to about 50% hydrogen by volume.

These and additional embodiments are further described below.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or FIGURES (also "FIG." and "FIGS." herein), of which:

FIG. 1 shows a schematic representation of an example of a reactor/apparatus.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed. It shall be understood that different aspects of the invention can be appreciated individually, collectively, or in combination with each other.

The present disclosure provides systems and methods for affecting chemical changes. Affecting such chemical changes may include making particles (e.g., carbon particles, such as, for example, carbon black) using the systems and methods of the present disclosure. While such particles may be described herein primarily in terms of or in the context of carbon particles, the particles of the present disclosure may include other types of particles. The chemical changes described herein may be (e.g., primarily, substantially, entirely or at least in part) affected using energy not associated or closely connected with raw materials used to convert hydrocarbon-containing materials into carbon particles (e.g., carbon black). The systems and methods described herein may use electrical energy to affect the chemical changes. Processes implemented with the aid of the systems and methods herein may include heating a thermal transfer gas (e.g., a plasma gas). The thermal transfer gas may be heated with electrical energy (e.g., from a DC or AC source). The thermal transfer gas may be heated by an electric arc. Heated thermal transfer gas may be mixed with a hydrocarbon feedstock to generate the carbon particles (e.g., carbon black).

The thermal transfer gas may in some instances be heated in an oxygen-free environment. The carbon particles may in some instances be produced (e g, manufactured) in an oxygen-free atmosphere. An oxygen-free atmosphere may comprise, for example, less than about 5% oxygen by volume, less than about 3% oxygen (e.g., by volume), or less than about 1% oxygen (e.g., by volume).

The systems and methods described herein may include heating hydrocarbons rapidly to form carbon particles (e.g., carbon nanoparticles). For example, the hydrocarbons may be heated rapidly to form carbon particles (e.g., carbon nanoparticles) and hydrogen. The carbon particles (also "particles" herein) may include, for example, carbon black particles. Hydrogen (e.g., hydrogen generated from methane in the process of forming carbon black) may in some cases refer to majority hydrogen. For example, some portion of this hydrogen may also contain methane (e.g., unspent methane) and/or various other hydrocarbons (e.g., ethane, propane, ethylene, acetylene, benzene, toluene, polycyclic aromatic hydrocarbons (PAH) such as naphthalene, etc.). In some examples, when referring to hydrogen, these minor constituents may be included as being part of this gas flow that is utilized within the system (e.g., within a carbon black generating system). Hydrogen generated in the processes described herein may be used for many applications.

The thermal transfer gas may comprise at least about 60% hydrogen up to about 100% hydrogen (by volume) and may further comprise up to about 30% nitrogen, up to about 30%

CO, up to about 30% $CH_4$, up to about 10% HCN, up to about 30% $C_2H_2$, and up to about 30% Ar. For example, the thermal transfer gas may be greater than about 60% hydrogen. Additionally, the thermal transfer gas may also comprise polycyclic aromatic hydrocarbons such as anthracene, naphthalene, coronene, pyrene, chrysene, fluorene, and the like. In addition, the thermal transfer gas may have benzene and toluene or similar monoaromatic hydrocarbon components present. For example, the thermal transfer gas may comprise greater than or equal to about 90% hydrogen, and about 0.2% nitrogen, about 1.0% CO, about 1.1% $CH_4$, about 0.1% HCN and about 0.1% $C_2H_2$. The thermal transfer gas may comprise greater than or equal to about 80% hydrogen and the remainder may comprise some mixture of the aforementioned gases, polycyclic aromatic hydrocarbons, monoaromatic hydrocarbons and other components. Thermal transfer gas such as oxygen, nitrogen, argon, helium, air, hydrogen, carbon monoxide, hydrocarbon (e.g. methane, ethane, unsaturated) etc. (used alone or in mixtures of two or more) may be used. The thermal transfer gas may comprise greater than or equal to about 50% hydrogen by volume. The thermal transfer gas may comprise, for example, oxygen, nitrogen, argon, helium, air, hydrogen, hydrocarbon (e.g. methane, ethane) etc. (used alone or in mixtures of two or more). The thermal transfer gas may comprise greater than about 70% H2 by volume and may include at least one or more of the gases HCN, $CH_4$, $C_2H_4$, $C_2H_2$, CO, benzene or polyaromatic hydrocarbon (e.g., naphthalene and/or anthracene) at a level of at least about 1 ppm. The thermal transfer gas may have at least a subset of such compositions before, during and/or after heating.

The hydrocarbon feedstock may include any chemical with formula $C_nH_x$ or $C_nH_xO_y$, where n is an integer; x is between (i) 1 and 2n+2 or (ii) less than 1 for fuels such as coal, coal tar, pyrolysis fuel oils, and the like; and y is between 0 and n. The hydrocarbon feedstock may include, for example, simple hydrocarbons (e.g., methane, ethane, propane, butane, etc.), aromatic feedstocks (e.g., benzene, toluene, methyl naphthalene, pyrolysis fuel oil, coal tar, coal, heavy oil, oil, bio-oil, bio-diesel, other biologically derived hydrocarbons, and the like), unsaturated hydrocarbons (e.g., ethylene, acetylene, butadiene, styrene, and the like), oxygenated hydrocarbons (e.g., ethanol, methanol, propanol, phenol, ketones, ethers, esters, and the like), or any combination thereof. These examples are provided as non-limiting examples of acceptable hydrocarbon feedstocks which may further be combined and/or mixed with other components for manufacture. A hydrocarbon feedstock may refer to a feedstock in which the majority of the feedstock (e.g., more than about 50% by weight) is hydrocarbon in nature. The reactive hydrocarbon feedstock may comprise at least about 70% by weight methane, ethane, propane or mixtures thereof. The hydrocarbon feedstock may be natural gas. The hydrocarbon may be methane, ethane, or propane or mixtures thereof.

Carbon particles may comprise fine particles. A fine particle may be a particle that has at least one dimension that is less than 100 nm (nanometers). A fine particle may be an aggregate that is smaller than about 5 microns average size when measured in the largest dimension via scanning or tunneling electron microscopy. The carbon particles may comprise spherical and/or ellipsoidal fine carbon particles. Spherical or ellipsoidal particles may mean singular particles and may also mean a plurality of particles that are stuck together in a fashion analogous to that of a bunch of grapes or aciniform. Carbon black may be an example of this type of fine carbon particle. The carbon particles may comprise few layer graphenes (FLG), which may comprise particles that possess two or more layers of graphene and have a shape that is best described as flat or substantially flat. The carbon particles may be substantially in disk form. The carbon particles may comprise carbonaceous pigment. A carbon particle may include a carbon nanoparticle. A carbon nanoparticle may include, for example, any particle which is 90% or greater carbon, has a surface area greater than 5 $m^2/g$ (square meters per gram), and the volume equivalent sphere possesses a diameter of less than 1 micron (displacement of liquid is equivalent to a 1 micron sphere or less per particle). This may comprise many different shapes including disks, bowls, cones, aggregated disks, few layer graphene (FLG), ellipsoidal, aggregated ellipsoidal, spheres, and aggregated spheres (e.g. carbon black), as non-limiting examples. The carbon nanoparticles may also comprise a plurality of these particle shapes. At least 90% of the particles in any given sample of carbon nanoparticles on a number basis may fall within the confines of this definition of carbon nanoparticles.

The thermal transfer gas may be provided to the system (e.g., to a reactor/apparatus) at a rate of, for example, greater than or equal to about 1 normal cubic meter/hour ($Nm^3$/hr), 2 $Nm^3$/hr, 5 $Nm^3$/hr, 10 $Nm^3$/hr, 25 $Nm^3$/hr, 50 $Nm^3$/hr, 75 $Nm^3$/hr, 100 $Nm^3$/hr, 150 $Nm^3$/hr, 200 $Nm^3$/hr, 250 $Nm^3$/hr, 273 $Nm^3$/hr, 300 $Nm^3$/hr, 333 $Nm^3$/hr, 350 $Nm^3$/hr, 399 $Nm^3$/hr, 400 $Nm^3$/hr, 420 $Nm^3$/hr, 440 $Nm^3$/hr, 450 $Nm^3$/hr, 451 $Nm^3$/hr, 467 $Nm^3$/hr, 477 $Nm^3$/hr, 500 $Nm^3$/hr, 502 $Nm^3$/hr, 550 $Nm^3$/hr, 600 $Nm^3$/hr, 650 $Nm^3$/hr, 700 $Nm^3$/hr, 750 $Nm^3$/hr, 800 $Nm^3$/hr, 850 $Nm^3$/hr, 900 $Nm^3$/hr, 950 $Nm^3$/hr, 1,000 $Nm^3$/hr, 2,000 $Nm^3$/hr, 3,000 $Nm^3$/hr, 4,000 $Nm^3$/hr, 5,000 $Nm^3$/hr, 6,000 $Nm^3$/hr, 7,000 $Nm^3$/hr, 8,000 $Nm^3$/hr, 9,000 $Nm^3$/hr, 10,000 $Nm^3$/hr, 12,000 $Nm^3$/hr, 14,000 $Nm^3$/hr, 16,000 $Nm^3$/hr, 18,000 $Nm^3$/hr, 20,000 $Nm^3$/hr, 30,000 $Nm^3$/hr, 40,000 $Nm^3$/hr, 50,000 $Nm^3$/hr, 60,000 $Nm^3$/hr, 70,000 $Nm^3$/hr, 80,000 $Nm^3$/hr, 90,000 $Nm^3$/hr or 100,000 $Nm^3$/hr. Alternatively, or in addition, the thermal transfer gas may be provided to the system (e.g., to the reactor apparatus) at a rate of, for example, less than or equal to about 100,000 $Nm^3$/hr, 90,000 $Nm^3$/hr, 80,000 $Nm^3$/hr, 70,000 $Nm^3$/hr, 60,000 $Nm^3$/hr, 50,000 $Nm^3$/hr, 40,000 $Nm^3$/hr, 30,000 $Nm^3$/hr, 20,000 $Nm^3$/hr, 18,000 $Nm^3$/hr, 16,000 $Nm^3$/hr, 14,000 $Nm^3$/hr, 12,000 $Nm^3$/hr, 10,000 $Nm^3$/hr, 9,000 $Nm^3$/hr, 8,000 $Nm^3$/hr, 7,000 $Nm^3$/hr, 6,000 $Nm^3$/hr, 5,000 $Nm^3$/hr, 4,000 $Nm^3$/hr, 3,000 $Nm^3$/hr, 2,000 $Nm^3$/hr, 1,000 $Nm^3$/hr, 950 $Nm^3$/hr, 900 $Nm^3$/hr, 850 $Nm^3$/hr, 800 $Nm^3$/hr, 750 $Nm^3$/hr, 700 $Nm^3$/hr, 650 $Nm^3$/hr, 600 $Nm^3$/hr, 550 $Nm^3$/hr, 502 $Nm^3$/hr, 500 $Nm^3$/hr, 477 $Nm^3$/hr, 467 $Nm^3$/hr, 451 $Nm^3$/hr, 450 $Nm^3$/hr, 440 $Nm^3$/hr, 420 $Nm^3$/hr, 400 $Nm^3$/hr, 399 $Nm^3$/hr, 350 $Nm^3$/hr, 333 $Nm^3$/hr, 300 $Nm^3$/hr, 273 $Nm^3$/hr, 250 $Nm^3$/hr, 200 $Nm^3$/hr, 150 $Nm^3$/hr, 100 $Nm^3$/hr, 75 $Nm^3$/hr, 50 $Nm^3$/hr, 25 $Nm^3$/hr, 10 $Nm^3$/hr, 5 $Nm^3$/hr or 2 $Nm^3$/hr. The thermal transfer gas may be provided to the system (e.g., to the reactor apparatus) at such rates in combination with one or more feedstock flow rates described herein. The thermal transfer gas may be heated at such flow rates to one or more temperatures described herein.

The thermal transfer gas may be split into one or more flow paths. The thermal gas flow rate though a given flow path (e.g., through a shield path, through an annulus path and/or through an axial path described in greater detail elsewhere herein) may be, for example, greater than or equal to about 0%, 1%, 2%, 5%, 10%, 14%, 15%, 20%, 24%, 25%, 26%, 30%, 32%, 33%, 35%, 37%, 38%, 40%, 42%, 45%, 48%, 50%, 51%, 55%, 60%, 65%, 70%, 73%, 75%, 80%, 85%, 90%, 95% or 99%. Alternatively, or in addition, the thermal gas flow rate though a given flow path (e.g., through a shield path, through an annulus path and/or through an axial path) may be, for example, less than or equal to about 100%, 99%, 95%, 90%, 85%, 80%, 75%, 73%, 70%, 65%, 60%, 55%, 51%, 50%, 48%, 45%, 42%, 40%, 38%, 37%, 35%, 33%, 32%, 30%, 26%, 25%, 24%, 20%, 15%, 14%, 10%, 5%, 2% or 1%.

The feedstock (e.g., hydrocarbon) may be provided to the system (e.g., to a reactor/apparatus) at a rate of, for example, greater than or equal to about 50 grams per hour (g/hr), 100 g/hr, 250 g/hr, 500 g/hr, 750 g/hr, 1 kilogram per hour (kg/hr), 2 kg/hr, 5 kg/hr, 10 kg/hr, 15 kg/hr, 20 kg/hr, 25 kg/hr, 30 kg/hr, 32 kg/h, 35 kg/hr, 37 kg/h, 40 kg/hr, 42 kg/h, 45 kg/hr, 48 kg/h, 50 kg/hr, 55 kg/hr, 56 kg/h, 60 kg/hr, 65 kg/hr, 70 kg/hr, 75 kg/hr, 80 kg/hr, 85 kg/hr, 88 kg/h, 90 kg/hr, 95 kg/hr, 100 kg/hr, 150 kg/hr, 200 kg/hr, 250 kg/hr, 300 kg/hr, 350 kg/hr, 400 kg/hr, 450 kg/hr, 500 kg/hr, 600 kg/hr, 700 kg/hr, 800 kg/hr, 900 kg/hr, 1,000 kg/hr, 1,100 kg/hr, 1,200 kg/hr, 1,300 kg/hr, 1,400 kg/hr, 1,500 kg/hr, 1,600 kg/hr, 1,700 kg/hr, 1,800 kg/hr, 1,900 kg/hr, 2,000 kg/hr, 2,100 kg/hr, 2,200 kg/hr, 2,300 kg/hr, 2,400 kg/hr, 2,500 kg/hr, 3,000 kg/hr, 3,500 kg/hr, 4,000 kg/hr, 4,500 kg/hr, 5,000 kg/hr, 6,000 kg/hr, 7,000 kg/hr, 8,000 kg/hr, 9,000 kg/hr or 10,000 kg/hr. Alternatively, or in addition, the feedstock (e.g., hydrocarbon) may be provided to the system (e.g., to the reactor apparatus) at a rate of, for example, less than or equal to about 10,000 kg/hr, 9,000 kg/hr, 8,000 kg/hr, 7,000 kg/hr, 6,000 kg/hr, 5,000 kg/hr, 4,500 kg/hr, 4,000 kg/hr, 3,500 kg/hr, 3,000 kg/hr, 2,500 kg/hr, 2,400 kg/hr, 2,300 kg/hr, 2,200 kg/hr, 2,100 kg/hr, 2,000 kg/hr, 1,900 kg/hr, 1,800 kg/hr, 1,700 kg/hr, 1,600 kg/hr, 1,500 kg/hr, 1,400 kg/hr, 1,300 kg/hr, 1,200 kg/hr, 1,100 kg/hr, 1,000 kg/hr, 900 kg/hr, 800 kg/hr, 700 kg/hr, 600 kg/hr, 500 kg/hr, 450 kg/hr, 400 kg/hr, 350 kg/hr, 300 kg/hr, 250 kg/hr, 200 kg/hr, 150 kg/hr, 100 kg/hr, 95 kg/hr, 90 kg/hr, 88 kg/h, 85 kg/hr, 80 kg/hr, 75 kg/hr, 70 kg/hr, 65 kg/hr, 60 kg/hr, 56 kg/h, 55 kg/hr, 50 kg/hr, 48 kg/hr, 45 kg/hr, 42 kg/h, 40 kg/hr, 37 kg/h, 35 kg/hr, 32 kg/hr, 30 kg/hr, 25 kg/hr, 20 kg/hr, 15 kg/hr, 10 kg/hr, 5 kg/hr, 2 kg/hr, 1 kg/hr, 750 g/hr, 500 g/hr, 250 g/hr or 100 g/hr.

The thermal transfer gas may be heated to and/or the feedstock may be subjected to a temperature of greater than or equal to about 1,000° C., 1,100° C., 1,200° C., 1,300° C., 1,400° C., 1,500° C., 1,600° C., 1,700° C., 1,800° C., 1,900° C., 2,000° C., 2050° C., 2,100° C., 2,150° C., 2,200° C., 2,250° C., 2,300° C., 2,350° C., 2,400° C., 2,450° C., 2,500° C., 2,550° C., 2,600° C., 2,650° C., 2,700° C., 2,750° C., 2,800° C., 2,850° C., 2,900° C., 2,950° C., 3,000° C., 3,050° C., 3,100° C., 3,150° C., 3,200° C., 3,250° C., 3,300° C., 3,350° C., 3,400° C. or 3,450° C. Alternatively, or in addition, the thermal transfer gas may be heated to and/or the feedstock may be subjected to a temperature of less than or equal to about 3,500° C., 3,450° C., 3,400° C., 3,350° C., 3,300° C., 3,250° C., 3,200° C., 3,150° C., 3,100° C., 3,050° C., 3,000° C., 2,950° C., 2,900° C., 2,850° C., 2,800° C., 2,750° C., 2,700° C., 2,650° C., 2,600° C., 2,550° C., 2,500° C., 2,450° C., 2,400° C., 2,350° C., 2,300° C., 2,250° C., 2,200° C., 2,150° C., 2,100° C., 2050° C., 2,000° C., 1,900° C., 1,800° C., 1,700° C., 1,600° C., 1,500° C., 1,400° C., 1,300° C., 1,200° C. or 1,100° C. The thermal transfer gas may be heated to such temperatures by a thermal generator (e.g., a plasma generator). Such thermal generators may have suitable powers. The thermal generators may be configured to operate continuously at such powers for, for example, several hundred or several thousand hours in a corrosive environment.

Thermal generators may operate at suitable powers. The power may be, for example, greater than or equal to about 0.5 kilowatt (kW), 1 kW, 1.5 kW, 2 kW, 5 kW, 10 kW, 25 kW, 50 kW, 75 kW, 100 kW, 150 kW, 200 kW, 250 kW, 300 kW, 350 kW, 400 kW, 450 kW, 500 kW, 540 kW, 550 kW, 600 kW, 650 kW, 700 kW, 750 kW, 800 kW, 850 kW, 900 kW, 950 kW, 1 megawatt (MW), 1.05 MW, 1.1 MW, 1.15 MW, 1.2 MW, 1.25 MW, 1.3 MW, 1.35 MW, 1.4 MW, 1.45 MW, 1.5 MW, 1.6 MW, 1.7 MW, 1.8 MW, 1.9 MW, 2 MW, 2.5 MW, 3 MW, 3.5 MW, 4 MW, 4.5 MW, 5 MW, 5.5 MW, 6 MW, 6.5 MW, 7 MW, 7.5 MW, 8 MW, 8.5 MW, 9 MW, 9.5 MW, 10 MW, 10.5 MW, 11 MW, 11.5 MW, 12 MW, 12.5 MW, 13 MW, 13.5 MW, 14 MW, 14.5 MW, 15 MW, 16 MW, 17 MW, 18 MW, 19 MW, 20 MW, 25 MW, 30 MW, 35 MW, 40 MW, 45 MW or 50 MW. Alternatively, or in addition, the power may be, for example, less than or equal to about 50 MW, 45 MW, 40 MW, 35 MW, 30 MW, 25 MW, 20 MW, 19 MW, 18 MW, 17 MW, 16 MW, 15 MW, 14.5 MW, 14 MW, 13.5 MW, 13 MW, 12.5 MW, 12 MW, 11.5 MW, 11 MW, 10.5 MW, 10 MW, 9.5 MW, 9 MW, 8.5 MW, 8 MW, 7.5 MW, 7 MW, 6.5 MW, 6 MW, 5.5 MW, 5 MW, 4.5 MW, 4 MW, 3.5 MW, 3 MW, 2.5 MW, 2 MW, 1.9 MW, 1.8 MW, 1.7 MW, 1.6 MW, 1.5 MW, 1.45 MW, 1.4 MW, 1.35 MW, 1.3 MW, 1.25 MW, 1.2 MW, 1.15 MW, 1.1 MW, 1.05 MW, 1 MW, 950 kW, 900 kW, 850 kW, 800 kW, 750 kW, 700 kW, 650 kW, 600 kW, 550 kW, 540 kW, 500 kW, 450 kW, 400 kW, 350 kW, 300 kW, 250 kW, 200 kW, 150 kW, 100 kW, 75 kW, 50 kW, 25 kW, 10 kW, 5 kW, 2 kW, 1.5 kW or 1 kW.

FIG. 1 shows a cross-section of an example of a reactor 100. The reactor may comprise, for example, a plasma chamber and a reactor section. A central injector (e.g., hydrocarbon injector) 104 having an injector tip (e.g., hydrocarbon injector tip) 105 may be oriented along the axis of two electrodes (inner electrode 103 and outer electrode 102). The electrodes may be, for example, concentric cylinder electrodes. Thermal transfer gas (e.g., plasma gas) 101 may enter the space between the inner and outer electrodes. There may be a gap between the inner and outer electrode referred to as an annulus. The central injector (also "stinger" and "torch stinger" herein) may be at a distance D1 (e.g., greater than or equal to zero) from the inner electrode. The lowest point of the central injector or the point at which injection takes place may be at a distance D2 (e.g., greater than or equal to zero, or less than zero) from a plane of the electrodes (e.g., the plane L2 created by connecting lines drawn from the lowest point of the outer electrode to inner electrode, as shown). The lowest point of the central injector or the point at which injection takes place may be above, at, or below the plane of the electrodes (e.g., if D2 is positive then injection of feedstock occurs above the plane L2, if D2 is negative then injection occurs below the plane L2, and if D2 is zero then injection occurs at/in the plane L2). Injection below the plane may be enabled, for example, through the use of a cooled injector (e.g., water-cooled copper (or other material)) injector or a cooled (e.g., water-cooled) injector attached to an uncooled tube. Sheathing material that acts as a radiation shield may be used to further protect the injector. A change in geometry may occur at the imaginary plane denoted by line L1. The reactor may become narrower or wider dependent upon the angle α. The angle α (e.g., up to 90°) may be the angle between an imaginary extension of a plasma chamber wall 106 and a reactor transition wall 107 leading to a reactor wall 108. The lowest point of the electrodes may be at a distance D3 (e.g., greater than or equal to zero) from the line L1. The plasma chamber wall 106 may be at a distance D4 (e.g., greater than or equal to zero) from the outer electrode 102. Reactor walls 108 may be at a distance D6 (e.g., greater than or equal to zero) from each other. In some examples, D1 may be about 85 millimeters (mm), D2 may be from about −200 nm to about 446 mm, D3 may be from zero to about 1350 mm, D4 may be from about 73 mm to about 450 mm, D6 may be about 1200 mm, and a may be from about 9° up to 90°.

The injector or stinger may comprise or consist of, for example, three concentric tubes. The tubes may create, for example, two annuli for cooling (e.g., water cooling) and a central path for hydrocarbon feedstock (e.g., natural gas) injection. The injector may be cooled via a cooling liquid. The injector may be cooled by, for example, water or a non-oxidizing liquid (e.g., mineral oil, ethylene glycol, propylene glycol, synthetic organic fluids such as, for example, DOWTHERM™, etc.). The injector may be fabricated from suitable materials such as, for example, copper, stainless steel, graphite and/or other similar materials (e.g., alloys) with high melting points and good corrosion resistance (e.g., to hydrogen free radical environment). In some examples, a water-cooled metal may be used. Hydrocarbon flow from the cooled injector may be allowed to flow to an uncooled tube. The uncooled tube (also "tube" herein) may act as an injector but may be heated to a process temperature (e.g., temperature of the plasma or temperature of the thermal transfer gas) or to a temperature close to the process temperature (e.g., the uncooled tube may be allowed to float to, or close to, the process temperature). The tube may comprise or be made from, for example, carbon or silicon carbide or other high temperature material that may survive at temperatures greater than, for example, 1600° C.

Tips (also "injector tips" herein) may comprise (e.g., have) single or multiple holes that are parallel to the axis of the injector, angled, or a combination thereof. Angled holes may in some instances provide faster mixing (e.g., since distinct streams may provide more surface for mixing into the surrounding gas). The injector may have (e.g., optionally) replaceable tips that may be switched out (e.g., to affect mixing). A replaceable tip in the injector may allow for the selection of desired flow velocities by varying tip diameter.

A stream of natural gas or other hydrocarbon feedstock may be injected into (e.g., into the center of) a heat generator (also "thermal generator" herein). The stream of natural gas or other hydrocarbon feedstock may be injected with the aid of a cooled (e.g., water cooled) injector inserted into the heat generator (e.g., a plasma torch). Using a sliding seal, the injector may be inserted to different depths in order to increase or decrease residence time in the heat generator (e.g., torch), and/or to maintain residence time in the heat generator (e.g., torch) at some fixed value (e.g., as the plasma torch electrodes wear).

The injector may be inserted into the heat generator (e.g., into the center of the heat generator). The heat generator may be, for example, a plasma torch (also "torch" herein). The torch may comprise electrodes. One or more (e.g., a plurality of) injectors may be located or contained within the electrodes (e.g., within concentric electrodes). The electrodes may be used to generate a plasma arc in a high temperature zone. A high temperature zone may be, for example, a zone that is at a temperature greater than about 1000° C. The injected hydrocarbon may form carbon particles (e.g., carbon black) and hydrogen after passing through the high temperature zone. The temperature within a central location of the torch (e.g. centrally within the electrodes, such as, for example, inside of the inner electrode and/or adjacent to the injector) may be, for example, less than or equal to about 100%, 99%, 95%, 90%, 75%, 70%, 65%, 60%, 55%, 50%, 45%, 40%, 35%, 30%, 25%, 20%, 15%, 10%, 5% or 1% of the temperature of the plasma arc. The temperature within a central location of the torch (e.g. centrally within the electrodes, such as, for example, inside of the inner electrode and/or adjacent to the injector) may be, for example, greater than or equal to about 0%, 1%, 5%, 10%, 15%, 20%, 25%, 30%, 35%, 40%, 45%, 50%, 55%, 60%, 65%, 70%, 75%, 90% or 95% of the temperature of the plasma arc. In some examples, the temperature within the central location of the torch (e.g., centrally within the electrodes, such as, for example, inside of the inner electrode and/or adjacent to the injector) may be, for example, less than half of the temperature of the plasma arc.

The injector may be centered in the torch (e.g., the stinger may be aligned centrally within the electrodes). For example, the injector may be centered in the torch with one or more (e.g., at least 1, 2, 3, 4, 5, 6, 7, 8, 9 or 10) adjustable rods or centering fingers. Such rods or centering fingers may be made of (e.g., machined out of) one or more high temperature materials such as, for example, carbon (e.g., graphite), silicon carbide, tungsten and/or molybdenum. To center the stinger along the axis of the torch, the inner electrode may comprise threaded holes (e.g., have threaded holes machined in) so that rods may be inserted. The tips of the rods may touch the outer diameter of the injector and guide it as it is inserted while allowing gas to flow down the inner electrode around the injector. Alternatively, or in addition, the stinger may be pushed through a tapered hole surrounded by a ring of holes or slots that allow gas to flow around the stinger. A plate may have a central hole with a taper to help guide the stinger during insertion, and slots or holes surrounding the central hole may allow for gas flow. A "stuffing box" comprising or consisting of compressed packing (e.g., flexible graphite or polytetrafluoroethylene) may allow the injector to be inserted and/or retracted while maintaining a seal. Tips may be altered (e.g., as described herein in relation to replaceable tips). Tips may be altered (e.g., switched, replaced, added or otherwise varied) during operation (e.g., with the system hot). For example, tips may be altered with the system hot with the aid of the "stuffing box" arrangement and isolation valves.

Insertion length of the injector within the heat generator (e.g., within the electrodes of a torch) may be varied as described elsewhere herein (e.g., using a sliding seal). A variation in insertion length may in some cases be expressed in terms of a variation in D2. The insertion length may be varied (e.g., increased or decreased) such that D2 is varied (e.g., increased or decreased, including inverted) by, for example, greater than or equal to about 0%, 1%, 2%, 5%, 10%, 15%, 20%, 25%, 30%, 35%, 40%, 45%, 50%, 55%, 60%, 65%, 70%, 75%, 80%, 85%, 90%, 95%, 99%, 100%, 125%, 150%, 175%, 200%, 225%, 250%, 275%, 300%, 325%, 350%, 375%, 400%, 425%, 450%, 475% or 500%. Alternatively, or in addition, the insertion length may be varied (e.g., increased or decreased) such that D2 is varied (e.g., increased or decreased, including inverted) by, for example, less than or equal to about 500%, 475%, 450%, 425%, 400%, 375%, 350%, 325%, 300%, 275%, 250%, 225%, 200%, 175%, 150%, 125%, 100%, 99%, 95%, 90%, 85%, 80%, 75%, 70%, 65%, 60%, 55%, 50%, 45%, 40%, 35%, 30%, 25%, 20%, 15%, 10%, 5%, 2% or 1%.

The cooling (e.g., water cooling) circuit for the injector may be closely monitored for increases in temperature difference between the inlet and outlet sides of the circuit. The circuit may be monitored, for example, in order to assess torch wear. An increased temperature difference may indicate that the torch has worn upwards and that the hot electrode tips are closer to the injector. Once a certain threshold is reached, the injector may be retracted to return cooling losses to original values. A retraction may be triggered, for example, upon an increase in temperature difference between the inlet temperature and the outlet temperature of the cooling circuit of greater than or equal to about 0.5%, 1%, 2%, 5%, 10%, 15%, 20%, 25%, 30%, 40%, 50%, 60%, 70%, 80%, 90%, 95%, 100%, 150%, 200%, 250% or 500%. A strain gauge may be integrated into the electrode holder to weigh how much electrode material remains. Such information may (e.g., also) be used to trigger retractions of the injector. The strain gauge may in some instances provide a more direct measurement of electrode wear. Other examples of testing and sensing for electrode length changes may include for example, using optical devices such as cooled cameras or laser diagnostics to sense electrode wear (e.g., to sense the height of the electrodes). A retraction may in some instances correspond to maintaining D2. A retraction may be triggered, for example, upon a change (e.g., decrease) in weight measured by the strain gauge of greater than or equal to about 0.5%, 1%, 2%, 5%, 10%, 15%, 20%, 25%, 30%, 40%, 50%, 60%, 70%, 80%, 90%, 95% or 100%. A retraction may be triggered, for example, upon a change (e.g., a decrease in length of the electrodes, which may correspond to a change in height of the electrodes) measured by another measurement device such as, for example, an optical device (e.g., a cooled camera and/or laser diagnostics) of greater than or equal to about 0.5%, 1%, 2%, 5%, 10%, 15%, 20%, 25%, 30%, 40%, 50%, 60%, 70%, 80%, 90%, 95% or 100%.

One or more (e.g., three) gas (e.g., thermal transfer gas) flow paths may be arranged in and around (e.g., through) the heat generator (e.g., plasma torch). For example, one or more thermal transfer gas flow paths (e.g., a "shield" path, an "annulus" path, and/or an "axial" path) may be arranged in and around (e.g., through) the heat generator (e.g., plasma torch). The one or more thermal transfer gas flow paths may be configured, for example, to modulate the rate of mixing of the hydrocarbon feedstock (e.g., natural gas) stream with heated gases (e.g., to affect product morphology and/or product properties). The shield path may surround the torch. The shield path may aid in keeping the outside of the outer electrode and/or the reactor lining from accumulating deposits. The annulus path may be (e.g., may pass) between the electrodes. The annulus path may absorb (e.g., the most) heat from the arc. The axial path may flow down the inside of the inner electrode (e.g., around the injector). The axial gas, being cold, may provide some degree of dilution of the hydrocarbon feedstock (e.g., natural gas) prior to the hydrocarbon feedstock reaching temperatures where reactions may be initiated (e.g., pre-dilution). The degree of pre-dilution may (e.g., also) be a function of insertion length. Such factor(s) may affect how long the hydrocarbon feedstock (e.g., natural gas) and axial gas flow together before being exposed to heat and/or how fast the hydrocarbon feedstock reaches temperature(s) where reactions are initiated. The degree of pre-dilution may be used to control, for example, surface area and/or structure of the resultant carbon particles (e.g., carbon black). The pre-dilution (e.g., ratio of the axial gas flow to the injected hydrocarbon feedstock flow on a volumetric, molar or mass basis) may be varied (e.g., increased or decreased) by, for example, greater than or equal to about 0%, 1%, 2%, 5%, 10%, 15%, 20%, 25%, 30%, 35%, 40%, 45%, 50%, 55%, 60%, 65%, 70%, 75%, 80%, 85%, 90%, 95% or 99%. Alternatively, or in addition, the pre-dilution may be varied (e.g., increased or decreased) by, for example, less than or equal to about 100%, 99%, 95%, 90%, 85%, 80%, 75%, 70%, 65%, 60%, 55%, 50%, 45%, 40%, 35%, 30%, 25%, 20%, 15%, 10%, 5%, 2% or 1% (e.g., on a weight or molar basis). The hydrocarbon feedstock (e.g., natural gas) and axial gas may (e.g., next) be exposed to the annulus gas, which may vary greatly in temperature depending on torch power and annulus gas flow rate. The annulus gas may strongly affect, for example, product surface area and/or structure. Greater than or equal to about 0%, 1%, 2%, 5%, 10%, 15%, 20%, 25%, 30%, 35%, 40%, 45%, 50%, 55%, 60%, 65%, 70%, 75%, 90%, 95%, or 99% of the thermal transfer gas may be directed to flow axially (e.g., around at least one hydrocarbon injector). Alternatively, or in addition, less than or equal to about 100%, 99%, 95%, 90%, 75%, 65%, 60%, 55%, 50%, 45%, 40%, 35%, 30%, 25%, 20%, 15%, 10%, 5%, 2% or 1% of the thermal transfer gas may be directed to flow axially (e.g., around at least one hydrocarbon injector).

Downstream of the injector, the interior walls (also "liner" and "lining" herein) of the reactor may be arranged in various ways (e.g., to alter the amount of heat (radiation) that is radiating from the walls at the forming product (particles), and/or to give the forming particles sufficient time of flight and prevent buildup of deposits). The torch with injector may be combined with a reactor configured with a liner that may be used to separate an inner reaction zone and an outer insulated area that contains a different gas to reduce the thermal conductivity of the insulation. Product (particle) properties (e.g., product quality) may in some cases be controlled/affected by the configuration of the reactor lining downstream of the plasma torch. A liner with a relatively small diameter may absorb radiation from the torch and then re-radiate heat out toward forming particles, increasing the temperature ramp rate. The diameter may be increased to reduce the amount of radiation transferred and alter the time temperature history of forming particles. An increased diameter may (e.g., also) reduce deposits of product (particles) onto the liner walls. A conical configuration (e.g., a conical liner) may be used. The conical liner may provide strong radiation transfer to the forming product at first, while the increasing diameter further downstream may reduce the chance of deposit buildup as the hydrocarbon feedstock (e.g., natural gas) spreads outward toward the walls. Any suitable combination of small diameter, large diameter and conical (or other) geometries may be used to affect resulting carbon particle properties (e.g., surface area, structure, morphology, etc.) and/or deposit formation.

Considering that the stinger may be located within close proximity to the heat generation (e.g., plasma generation), heat loss(es) due to injectors of the present disclosure may be surprisingly low. The heat loss(es) due to injectors described herein may be below a given value. Heat loss(es) during a process described herein due to the presence of at least one such injector may be, for example, less than or equal to about 50%, 45%, 40%, 35%, 30%, 25%, 20%, 15%, 10%, 5%, 4%, 3%, 2%, 1%, 0.5%, 0.1% or 0.05% of total energy input into the process. Alternatively, or in addition, heat loss(es) during a process described herein due to the presence of at least one such injector may be, for example, greater than or equal to about 0%, 0.05%, 0.1%, 0.5%, 1%, 2%, 3%, 4%, 5%, 10%, 15%, 20%, 25%, 30%, 35%, 40% or 45% of total energy input into the process. In some examples, heat loss(es) resulting from injectors of the present disclosure (e.g., heat losses due to a water-cooled stinger) may be less than about 2% of the energy (e.g., heating energy) added to the system (e.g., to crack methane into carbon black and hydrogen).

Radiation shielding may be used to aid in the protection of the stinger. The radiation shielding may comprise high temperature material (e.g., graphite or silicon carbide) that may absorb and re-emit radiation. The radiation shielding may absorb at least a portion (e.g., a majority) of the radiation. The radiation shielding may re-emit at least a portion of the radiation. The radiation shielding may prevent the injector (e.g., a cooled injector, such as, for example, a water-cooled injector) from being exposed to the full heat load (e.g., radiative heat load) of the plasma arc (e.g., which may exceed 5000° C. in some areas). The radiation shielding may be, for example, cylindrical, conical, square or rectangular.

Carbon particles (e.g., carbon black), or carbon particles (e.g., carbon black) and hydrogen, may be generated at a yield (e.g., yield of carbon particles based upon feedstock conversion rate, based on total hydrocarbon injected, on a weight percent carbon basis, as measured by moles of product carbon vs. moles of reactant carbon, or based on total conversion rate of feedstock) of, for example, greater than or equal to about 1%, 5%, 10%, 25%, 50%, 55%, 60%, 65%, 70%, 75%, 80%, 85%, 90%, 91%, 92%, 93%, 94%, 95%, 96%, 97%, 98%, 99%, 99.5% or 99.9%. Alternatively, or in addition, the carbon particles may be generated at a yield (e.g., yield of carbon particles based upon feedstock conversion rate, based on total hydrocarbon injected, on a weight percent carbon basis, as measured by moles of product carbon vs. moles of reactant carbon, or based on total conversion rate of feedstock) of, for example, less than or equal to about 100%, 99.9%, 99.5%, 99%, 98%, 97%, 96%, 95%, 94%, 93%, 92%, 91%, 90%, 85%, 80%, 75%, 70%, 65%, 60%, 55%, 50%, 25% or 5%. In some examples, the carbon particles (e.g., carbon black) and hydrogen may be produced at greater than 95% yield. In some examples, yield of carbon nanoparticles based upon hydrocarbon (e.g., methane) conversion rate may be greater than 90%, 94% or 95%.

The geometry as well as the parametric inputs, described in greater detail elsewhere herein, may in some cases drastically affect surface area, structure and/or other properties of as-produced carbon particle(s) (e.g., carbon black). The carbon particle(s) (e.g., carbon black particle(s)) described herein may have various combinations of the properties described herein (e.g., the particle(s) may have a given property in combination with one or more other properties described herein). For example, the carbon particle(s) may have various combinations of N2SA, STSA, DBP, tote, d002 and $L_c$ values described herein.

Surface area of the carbon particle(s) (e.g., carbon black particle(s)) may refer to, for example, nitrogen surface area (N2SA) (e.g., nitrogen-based Brunauer-Emmett-Teller (BET) surface area) and/or statistical thickness surface area (STSA). The N2SA and STSA may be measured via ASTM D6556 (e.g., ASTM D6556-10). The surface areas described herein may refer to surface areas excluding (internal) porosity (e.g., excluding porous surface area due to any internal pores). The surface area (e.g., N2SA and/or STSA) may be, for example, greater than or equal to about 5 m²/g, 10 m²/g, 11 m²/g, 12 m²/g, 13 m²/g, 14 m²/g, 15 m²/g, 16 m²/g, 17 m²/g, 18 m²/g, 19 m²/g, 20 m²/g, 21 m²/g, 22 m²/g, 23 m²/g, 24 m²/g, 25 m²/g, 26 m²/g, 27 m²/g, 28 m²/g, 29 m²/g, 30 m²/g, 31 m²/g, 32 m²/g, 33 m²/g, 34 m²/g, 35 m²/g, 36 m²/g, 37 m²/g, 38 m²/g, 39 m²/g, 40 m²/g, 41 m²/g, 42 m²/g, 43 m²/g, 44 m²/g, 45 m²/g, 46 m²/g, 47 m²/g, 48 m²/g, 49 m²/g, 50 m²/g, 51 m²/g, 55 m²/g, 60 m²/g, 61 m²/g, 63 m²/g, 65 m²/g, 70 m²/g, 72 m²/g, 75 m²/g, 79 m²/g, 80 m²/g, 81 m²/g, 85 m²/g, 90 m²/g, 95 m²/g, 100 m²/g, 110 m²/g, 119 m²/g, 120 m²/g, 121 m²/g, 125 m²/g, 130 m²/g, 140 m²/g, 150 m²/g, 160 m²/g, 170 m²/g, 180 m²/g, 190 m²/g, 200 m²/g, 210 m²/g, 220 m²/g, 230 m²/g, 240 m²/g, 250 m²/g, 260 m²/g, 270 m²/g, 280 m²/g, 290 m²/g or 300 m²/g. Alternatively, or in addition, the surface area (e.g., N2SA and/or STSA) may be, for example, less than or equal to about 300 m²/g, 290 m²/g, 280 m²/g, 270 m²/g, 260 m²/g, 250 m²/g, 240 m²/g, 230 m²/g, 220 m²/g, 210 m²/g, 200 m²/g, 190 m²/g, 180 m²/g, 170 m²/g, 160 m²/g, 150 m²/g, 140 m²/g, 130 m²/g, 125 m²/g, 121 m²/g, 120 m²/g, 119 m²/g, 110 m²/g, 100 m²/g, 95 m²/g, 90 m²/g, 85 m²/g, 81 m²/g, 80 m²/g, 79 m²/g, 75 m²/g, 72 m²/g, 70 m²/g, 65 m²/g, 63 m²/g, 61 m²/g, 60 m²/g, 55 m²/g, 51 m²/g, 50 m²/g, 49 m²/g, 48 m²/g, 47 m²/g, 46 m²/g, 45 m²/g, 44 m²/g, 43 m²/g, 42 m²/g, 41 m²/g, 40 m²/g, 39 m²/g, 38 m²/g, 37 m²/g, 36 m²/g, 35 m²/g, 34 m²/g, 33 m²/g, 32 m²/g, 31 m²/g, 30 m²/g, 29 m²/g, 28 m²/g, 27 m²/g, 26 m²/g, 25 m²/g, 24 m²/g, 23 m²/g, 22 m²/g, 21 m²/g, 20 m²/g, 19 m²/g, 18 m²/g, 17 m²/g, 16 m²/g, 15 m²/g, 14 m²/g, 13 m²/g, 12 m²/g, 11 m²/g, 10 m²/g or 5 m²/g. In some examples, the N2SA and/or the STSA (e.g., excluding pores that are internal to the primary particles) of the resultant carbon particles (e.g., carbon black) may be between 15 and 150 m²/g.

The structure of the carbon particles (e.g., carbon black particles) may be expressed in terms of dibutyl phthalate (DBP) absorption, which measures the relative structure of carbon particles (e.g., carbon black) by determining the amount of DBP a given mass of carbon particles (e.g., carbon black) can absorb before reaching a specified viscorheologic target torque. A lower DBP number may indicate a lower degree of particle aggregation or structure. The term structure may be used interchangeably with the term DBP (e.g., a high structure material possesses a high DBP value). The structures described herein may refer to structure after pelletization (e.g., post-pelletized DBP). DBP absorption (also "DBP" herein) may be measured in accordance with ASTM D2414 (e.g., ASTM D2414-12). The DBP may be, for example, greater than or equal to about 1 ml/100 g, 5 ml/100 g, 10 ml/100 g, 15 ml/100 g, 20 ml/100 g, 25 ml/100 g, 32 ml/100 g, 40 ml/100 g, 45 ml/100 g, 50 ml/100 g, 55 ml/100 g, 56 ml/100 g, 57 ml/100 g, 58 ml/100 g, 59 ml/100 g, 60 ml/100 g, 61 ml/100 g, 62 ml/100 g, 63 ml/100 g, 64 ml/100 g, 65 ml/100 g, 66 ml/100 g, 67 ml/100 g, 68 ml/100 g, 69 ml/100 g, 70 ml/100 g, 71 ml/100 g, 72 ml/100 g, 73 ml/100 g, 74 ml/100 g, 75 ml/100 g, 76 ml/100 g, 78 ml/100 g, 80 ml/100 g, 81 ml/100 g, 82 ml/100 g, 83 ml/100 g, 84 ml/100 g, 85 ml/100 g, 86 ml/100 g, 87 ml/100 g, 88 ml/100 g, 89 ml/100 g, 90 ml/100 g, 91 ml/100 g, 92 ml/100 g, 93 ml/100 g, 94 ml/100 g, 95 ml/100 g, 96 ml/100 g, 97 ml/100 g, 98 ml/100 g, 99 ml/100 g, 100 ml/100 g, 101 ml/100 g, 105 ml/100 g, 109 ml/100 g, 110 ml/100 g, 111 ml/100 g, 112 ml/100 g, 113 ml/100 g, 114 ml/100 g, 115 ml/100 g, 116 ml/100 g, 117 ml/100 g, 118 ml/100 g, 119 ml/100 g, 120 ml/100 g, 121 ml/100 g, 122 ml/100 g, 123 ml/100 g, 124 ml/100 g, 125 ml/100 g, 126 ml/100 g, 127 ml/100 g, 128 ml/100 g, 129 ml/100 g, 130 ml/100 g, 131 ml/100 g, 132 ml/100 g, 134 ml/100 g, 135 ml/100 g, 136 ml/100 g, 137 ml/100 g, 138 ml/100 g, 140 ml/100 g, 142 ml/100 g, 145 ml/100 g, 150 ml/100 g, 155 ml/100 g, 160 ml/100 g, 165 ml/100 g, 170 ml/100 g, 175 ml/100 g, 180 ml/100 g, 185 ml/100 g, 190 ml/100 g, 195 ml/100 g, 200 ml/100 g, 205 ml/100 g, 210 ml/100 g, 215 ml/100 g, 220 ml/100 g, 225 ml/100 g, 230 ml/100 g, 235 ml/100 g, 240 ml/100 g, 245 ml/100 g, 250 ml/100 g, 255 ml/100 g, 260 ml/100 g, 265 ml/100 g, 270 ml/100 g, 275 ml/100 g, 280 ml/100 g, 285 ml/100 g, 290 ml/100 g, 295 ml/100 g or 300 ml/100 g. Alternatively, or in addition, the DBP may be, for example, less than or equal to about 300 ml/100 g, 295 ml/100 g, 290 ml/100 g, 285 ml/100 g, 280 ml/100 g, 275 ml/100 g, 270 ml/100 g, 265 ml/100 g, 260 ml/100 g, 255 ml/100 g, 245 ml/100 g, 240 ml/100 g, 235 ml/100 g, 230 ml/100 g, 225 ml/100 g, 220 ml/100 g, 215 ml/100 g, 210 ml/100 g, 205 ml/100 g, 200 ml/100 g, 195 ml/100 g, 190 ml/100 g, 185 ml/100 g, 180 ml/100 g, 175 ml/100 g, 170 ml/100 g, 165 ml/100 g, 160 ml/100 g, 155 ml/100 g, 150 ml/100 g, 145 ml/100 g, 142 ml/100 g, 140 ml/100 g, 138 ml/100 g, 137 ml/100 g, 136 ml/100 g, 135 ml/100 g, 134 ml/100 g, 132 ml/100 g, 131 ml/100 g, 130 ml/100 g, 129 ml/100 g, 128 ml/100 g, 127 ml/100 g, 126 ml/100 g, 125 ml/100 g, 124 ml/100 g, 123 ml/100 g, 122 ml/100 g, 121 ml/100 g, 120 ml/100 g, 119 ml/100 g, 118 ml/100 g, 117 ml/100 g, 116 ml/100 g, 115 ml/100 g, 114 ml/100 g, 113 ml/100 g, 112 ml/100 g, 111 ml/100 g, 110 ml/100 g, 109 ml/100 g, 105 ml/100 g, 101 ml/100 g, 100 ml/100 g, 99 ml/100 g, 98 ml/100 g, 97 ml/100 g, 96 ml/100 g, 95 ml/100 g, 94 ml/100 g, 93 ml/100 g, 92 ml/100 g, 91 ml/100 g, 90 ml/100 g, 89 ml/100 g, 88 ml/100 g, 87 ml/100 g, 86 ml/100 g, 85 ml/100 g, 84 ml/100 g, 83 ml/100 g, 82 ml/100 g, 81 ml/100 g, 80 ml/100 g, 78 ml/100 g, 76 ml/100 g, 75 ml/100 g, 74 ml/100 g, 73 ml/100 g, 72 ml/100 g, 71 ml/100 g, 70 ml/100 g, 69 ml/100 g, 68 ml/100 g, 67 ml/100 g, 66 ml/100 g, 65 ml/100 g, 64 ml/100 g, 63 ml/100 g, 62 ml/100 g, 61 ml/100 g, 60 ml/100 g, 59 ml/100 g, 58 ml/100 g, 57 ml/100 g, 56 ml/100 g, 55 ml/100 g, 50 ml/100 g, 45 ml/100 g, 40 ml/100 g or 32 ml/100 g. In some examples, the DBP of the resultant carbon particles (e.g., carbon black) may be greater than 32 ml/100 g.

Transmittance of toluene extract (TOTE) of the carbon particle(s) (e.g., carbon black particle(s)) may be quantified, for example, using ASTM D1618 (e.g., ASTM D1618-99). The tote (also "TOTE" herein) may be, for example, greater than or equal to about 50%, 75%, 80%, 85%, 86%, 87%, 88%, 89%, 90%, 91%, 91.5%, 92%, 92.5%, 93%, 93.5%, 94%, 94.5%, 95%, 95.5%, 96%, 96.5%, 97%, 97.5%, 98%, 98.5%, 99%, 99.1%, 99.2%, 99.3%, 99.4%, 99.5%, 99.5%, 99.7%, 99.8%, 99.9% or 100%. Alternatively, or in addition, the tote may be, for example, less than or equal to about 100%, 99.9%, 99.8%, 99.7%, 99.5%, 99.5%, 99.4%, 99.3%, 99.2%, 99.1%, 99%, 98.5%, 98%, 97.5%, 97%, 96.5%, 96%, 95.5%, 95%, 94.5%, 94%, 93.5%, 93%, 92.5%, 92%, 91.5%, 91%, 90%, 89%, 88%, 87%, 86%, 85%, 80%, 75% or 50%.

Crystallinity of the carbon particle(s) (e.g., carbon nanoparticle(s)) may be measured, for example, via X-ray crystal diffractometry (XRD). For example, Cu K alpha radiation may be used at a voltage of 40 kV (kilovolts) and a current of 44 mA (milliamps). The scan rate may be 1.3 degrees/minute from 2 theta equal 12 to 90 degrees. The 002 peak of graphite may be analyzed using the Scherrer equation to obtain $L_c$ (lattice constant) and d002 (the lattice spacing of the 002 peak of graphite) values. Larger $L_c$ values may correspond to greater degree of crystallinity Smaller lattice spacing (d002) values may correspond to higher crystallinity or a more graphite-like lattice structure. Larger lattice spacing (d002) of, for example, 0.36 nm or larger may be indicative of turbostratic carbon. The may be, for example, greater than or equal to about 0.1 nm, 0.5 nm, 1 nm, 1.1 nm, 1.2 nm, 1.3 nm, 1.4 nm, 1.5 nm, 1.6 nm, 1.7 nm, 1.8 nm, 1.9 nm, 2 nm, 2.1 nm, 2.2 nm, 2.3 nm, 2.4 nm, 2.5 nm, 2.6 nm, 2.7 nm, 2.8 nm, 2.9 nm, 3 nm, 3.1 nm, 3.2 nm, 3.3 nm, 3.4 nm, 3.5 nm, 4 nm, 4.5 nm, 5 nm, 5.5 nm, 6 nm, 6.1 nm, 6.2 nm, 6.3 nm, 6.4 nm, 6.5 nm, 6.6 nm, 6.7 nm, 6.8 nm, 6.9 nm, 7 nm, 7.1 nm, 7.2 nm, 7.3 nm, 7.4 nm, 7.5 nm, 7.6 nm, 7.7 nm, 7.8 nm, 7.9 nm, 8 nm, 8.1 nm, 8.2 nm, 8.3 nm, 8.4 nm, 8.5 nm, 8.6 nm, 8.7 nm, 8.8 nm, 8.9 nm, 9 nm, 9.1 nm, 9.2 nm, 9.3 nm, 9.4 nm, 9.5 nm, 9.6 nm, 9.7 nm, 9.8 nm, 9.9 nm, 10 nm, 10.1 nm, 10.2 nm, 10.3 nm, 10.4 nm, 10.5 nm, 10.6 nm, 10.7 nm, 10.8 nm, 10.9 nm, 11 nm, 11.1 nm, 11.2 nm, 11.3 nm, 11.4 nm, 11.5 nm, 11.6 nm, 11.7 nm, 11.8 nm, 11.9 nm, 12 nm, 12.1 nm, 12.2 nm, 12.3 nm, 12.4 nm, 12.5 nm, 12.6 nm, 12.7 nm, 12.8 nm, 12.9 nm, 13 nm, 13.1 nm, 13.2 nm, 13.3 nm, 13.4 nm, 13.5 nm, 13.6 nm, 13.7 nm, 13.8 nm, 13.9 nm, 14 nm, 14.5 nm, 15 nm, 15.5 nm, 16 nm, 16.5 nm, 17 nm, 17.5 nm, 18 nm, 18.5 nm, 19 nm, 19.5 nm or 20 nm. Alternatively, or in addition, the may be, for example, less than or equal to about 20 nm, 19.5 nm, 19 nm, 18.5 nm, 18 nm, 17.5 nm, 17 nm, 16.5 nm, 16 nm, 15.5 nm, 15 nm, 14.5 nm, 14 nm, 13.9 nm, 13.8 nm, 13.7 nm, 13.6 nm, 13.5 nm, 13.4 nm, 13.3 nm, 13.2 nm, 13.1 nm, 13 nm, 12.9 nm, 12.8 nm, 12.7 nm, 12.6 nm, 12.5 nm, 12.4 nm, 12.3 nm, 12.2 nm, 12.1 nm, 12 nm, 11.9 nm, 11.8 nm, 11.7 nm, 11.6 nm, 11.5 nm, 11.4 nm, 11.3 nm, 11.2 nm, 11.1 nm, 11 nm, 10.9 nm, 10.8 nm, 10.7 nm, 10.6 nm, 10.5 nm, 10.4 nm, 10.3 nm, 10.2 nm, 10.1 nm, 10 nm, 9.9 nm, 9.8 nm, 9.7 nm, 9.6 nm, 9.5 nm, 9.4 nm, 9.3 nm, 9.2 nm, 9.1 nm, 9 nm, 8.9 nm, 8.8 nm, 8.7 nm, 8.6 nm, 8.5 nm, 8.4 nm, 8.3 nm, 8.2 nm, 8.1 nm, 8 nm, 7.9 nm, 7.8 nm, 7.7 nm, 7.6 nm, 7.5 nm, 7.4 nm, 7.3 nm, 7.2 nm, 7.1 nm, 7 nm, 6.9 nm, 6.8 nm, 6.7 nm, 6.6 nm, 6.5 nm, 6.4 nm, 6.3 nm, 6.2 nm, 6.1 nm, 6 nm, 5.5 nm, 5 nm, 4.5 nm, 4 nm, 3.5 nm, 3.4 n2.7 nm, m, 3.3 nm, 3.2 nm, 3.1 nm, 3 nm, 2.9 nm, 2.8 nm, 2.6 nm, 2.5 nm, 2.4 nm, 2.3 nm, 2.2 nm, 2.1 nm, 2 nm, 1.9 nm, 1.8 nm, 1.7 nm, 1.6 nm or 1.5 nm. The d002 may be, for example, less than or equal to about 0.5 nm, 0.49 nm, 0.48 nm, 0.47 nm, 0.46 nm, 0.45 nm, 0.44 nm, 0.43 nm, 0.42 nm, 0.41 nm, 0.4 nm, 0.395 nm, 0.39 nm, 0.385 nm, 0.38 nm, 0.375 nm, 0.37 nm, 0.369 nm, 0.368 nm, 0.367 nm, 0.366 nm, 0.365 nm, 0.364 nm, 0.363 nm, 0.362 nm, 0.361 nm, 0.360 nm, 0.359 nm, 0.358 nm, 0.357 nm, 0.356 nm, 0.355 nm, 0.354 nm, 0.353 nm, 0.352 nm, 0.351 nm, 0.350 nm, 0.349 nm, 0.348 nm, 0.347 nm, 0.346 nm, 0.345 nm, 0.344 nm, 0.343 nm, 0.342 nm, 0.341 nm, 0.340 nm, 0.339 nm, 0.338 nm, 0.337 nm, 0.336 nm, 0.335 nm, 0.334 nm, 0.333 nm or 0.332 nm. Alternatively, or in addition, the d002 may be, for example, greater than or equal to about 0.332 nm, 0.333 nm, 0.334 nm, 0.335 nm, 0.336 nm, 0.337 nm, 0.338 nm, 0.339 nm, 0.340 nm, 0.341 nm, 0.342 nm, 0.343 nm, 0.344 nm, 0.345 nm, 0.346 nm, 0.347 nm, 0.348 nm, 0.349 nm, 0.350 nm, 0.351 nm, 0.352 nm, 0.353 nm, 0.354 nm, 0.355 nm, 0.356 nm, 0.357 nm, 0.358 nm, 0.359 nm, 0.360 nm, 0.361 nm, 0.362 nm, 0.363 nm, 0.364 nm, 0.365 nm, 0.366 nm, 0.367 nm, 0.368 nm, 0.369 nm, 0.37 nm, 0.375 nm, 0.38 nm, 0.385 nm, 0.39 nm, 0.395 nm, 0.4 nm, 0.41 nm, 0.42 nm, 0.43 nm, 0.44 nm, 0.45 nm, 0.46 nm, 0.47 nm, 0.48 nm or 0.49 nm. In some examples, as-produced particles (e.g., carbon particles such as, for example, carbon black) may have an $L_c$ of greater than about 3.5 nm and a d002 of less than about 0.36 nm.

EXAMPLES

Example 1

Samples are manufactured using a setup similar to that shown in FIG. 1 with D1 of 85 mm, D2 of 446 mm, D3 of 1350 mm, D4 of 73 mm, D6 of 1200 mm and a of 40°. A water-cooled hydrocarbon injector is inserted into the center of two concentric electrodes. The electrodes are operated at 650 kW. The hydrogen flow rate in the annulus between the electrodes is 243 Nm³/hr (normal cubic meters/hour). The axial flow of hydrogen within the inner electrode is 45 Nm³/hr. The shield flow of hydrogen outside the outer electrode is 45 Nm³/hr. Natural gas is injected at a rate of 88 kg/hour. Yield of carbon nanoparticles based upon methane conversion rate is greater than 95%. The nitrogen surface area is 25 m²/g, STSA is 27 m²/g, and the DBP is 70 ml/100 g. Transmittance of toluene extract is 94%. $L_c$ according to powder XRD is 6.8 nm and d002 is 0.347 nm. Heat losses due to the water-cooled stinger are less than 8 kW.

Example 2

Samples are manufactured using a setup similar to that shown in FIG. 1 with D1 of 85 mm, D2 of 446 mm, D3 of 1350 mm, D4 of 73 mm, D6 of 1200 mm and a of 40°. A water-cooled hydrocarbon injector is inserted into the center of two concentric electrodes. The electrodes are operated at 600 kW. The hydrogen flow rate in the annulus between the electrodes is 177 Nm³/hr (normal cubic meters/hour). The axial flow of hydrogen within the inner electrode is 140 Nm³/hr. The shield flow of hydrogen outside the outer electrode is 150 Nm³/hr. Natural gas is injected at a rate of 48 kg/hour. Yield of carbon nanoparticles based upon methane conversion rate is greater than 95%. The nitrogen surface area is 48 m²/g, STSA is 51 m²/g, and the DBP is 137 ml/100 g. Transmittance of toluene extract is 100%. $L_c$ according to powder XRD is 9.8 nm and d002 is 0.345 nm. Heat losses due to the water-cooled stinger are less than 8 kW.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A carbon black particle generating reactor, comprising:
   a plasma generating section containing one or more sets of concentric electrodes configured to generate a plasma, wherein a wall of the plasma generating section is at a distance of greater than or equal to 73 millimeters from an outer electrode of the concentric electrodes;
   a reactor section connected to the plasma generating section; and
   a plurality of injectors contained within the concentric electrodes.

2. The reactor of claim 1, wherein the plurality of injectors is located centrally within the concentric electrodes.

3. The reactor of claim 1, further comprising a sliding seal, wherein said sliding seal is configured to vary an insertion length of injectors of the plurality of injectors.

4. The reactor of claim 1, wherein the plurality of injectors comprises a cooling circuit configured to permit cooling of the injector.

5. The reactor of claim 1, further comprising a liner.

6. The reactor of claim 5, wherein the liner is in a conical configuration.

7. The reactor of claim 1, wherein the reactor comprises or is made from carbon or silicon carbide or other high temperature material capable of surviving at temperatures greater than about 1600° C.

8. The reactor of claim 1, wherein an injector of the plurality of injectors comprises a replaceable injector tip.

9. A carbon black particle generating reactor, comprising:
   a plasma generating section containing one or more sets of concentric electrodes configured to generate a plasma, wherein a wall of the plasma generating section is at a distance of greater than or equal to 73 millimeters from an outer electrode of the concentric electrodes;
   a reactor section connected to the plasma generating section; and
   an injector located within the concentric electrodes,
   wherein the plasma generating section comprises thermal transfer gas flow paths (i) outside of the outer electrode of the concentric electrodes, (ii) between the concentric electrodes, and (iii) inside of an inner electrode of the concentric electrodes.

10. The reactor of claim 9, further comprising a sliding seal, wherein said sliding seal is configured to vary an insertion length of the injector.

11. The reactor of claim 9, further comprising a liner.

12. The reactor of claim 11, wherein the liner is in a conical configuration.

13. The reactor of claim 9, wherein the reactor comprises or is made from carbon or silicon carbide or other high temperature material capable of surviving at temperatures greater than about 1600° C.

14. The reactor of claim 9, wherein the injector comprises a replaceable injector tip.

15. The reactor of claim 9, wherein the injector is located centrally within the concentric electrodes.

16. The reactor of claim 9, wherein the injector comprises a cooling circuit configured to permit cooling of the injector.

* * * * *